No. 754,852. Patented March 15, 1904.

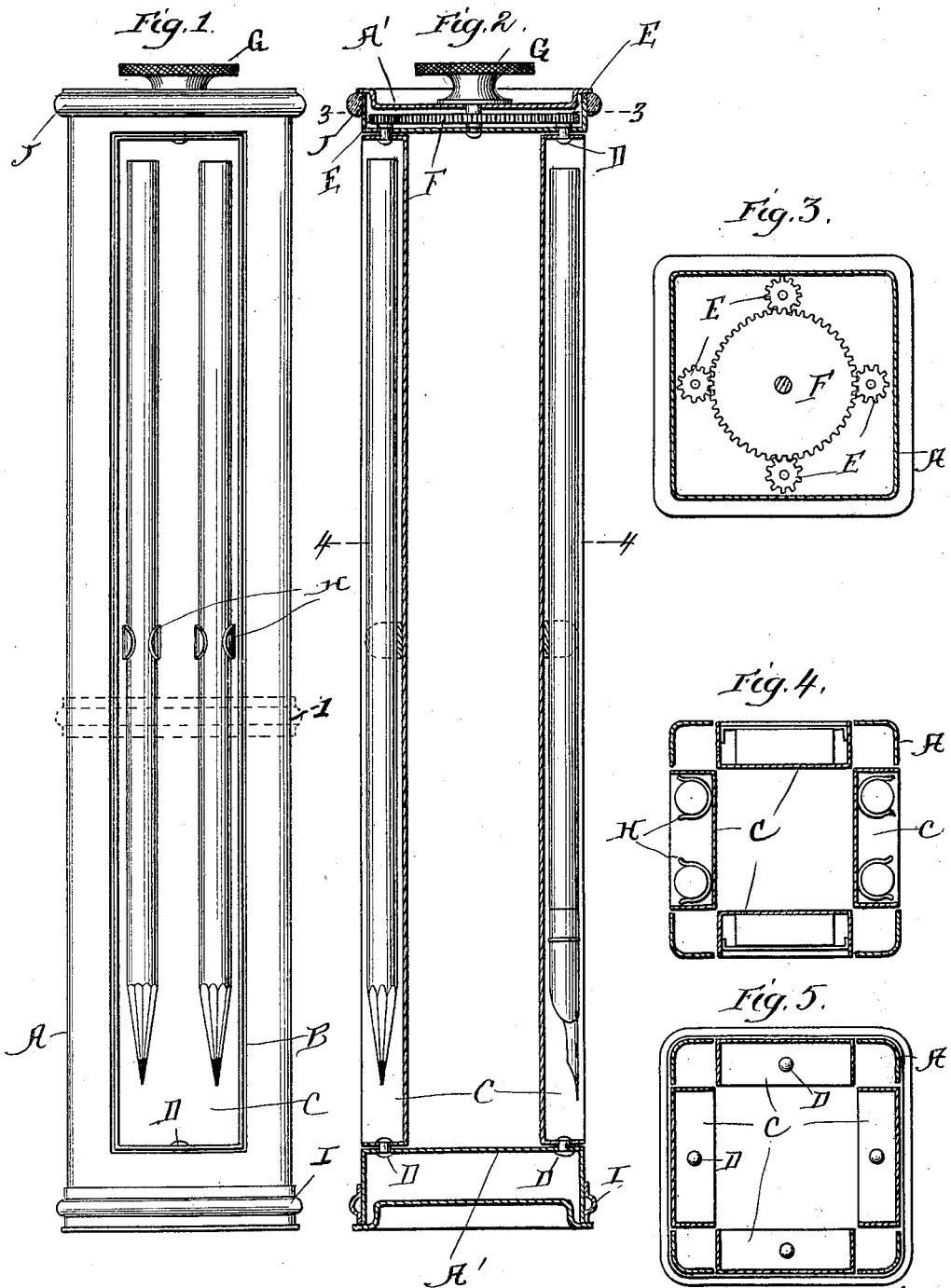

UNITED STATES PATENT OFFICE.

THOMAS CRAWFORD, OF PHILADELPHIA, PENNSYLVANIA.

SCHOOL COMPANION.

SPECIFICATION forming part of Letters Patent No. 754,852, dated March 15, 1904.

Application filed May 12, 1903. Serial No. 156,754. (No model.)

*To all whom it may concern:*

Be it known that I, THOMAS CRAWFORD, a citizen of the United States, residing at Philadelphia, county of Philadelphia, and State of Pennsylvania, have invented a certain new and useful Improvement in School Companions, of which the following is a specification.

My invention relates to a new and useful improvement in school companions, and has for its object to provide a case adapted to hold all of the necessary utensils used in school, this case consisting of a number of receptacles in which the utensils are placed, each of said receptacles adapted to revolve upon an axis, so as to expose the same to view and use, or to be turned inward, so that the bottom of the receptacle will be outward, and thus protect the utensils from damage or from dust.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—
Figure 1 is a side elevation of my improved device; Fig. 2, a longitudinal section through the same; Fig. 3, a cross-section on the line 3 3 of Fig. 2; Fig. 4, a section on the line 4 4 of Fig. 2; Fig. 5, a similar view to Fig. 4, showing the receptacles turned inward.

A represents the casing, which is preferably square in cross-section with rounded corners, and this casing is closed at each end, as represented at A'. Each side of the casing is cut away so as to provide the rectilinear opening B therethrough.

C represents receptacles, pan shape and slightly smaller in outline than the openings B, so as to fit in said openings. Each of these receptacles are journaled at each end, as represented at D, in the ends of the casing A, and at one end the pivots D of the receptacles extend through the end and have secured thereon the small cog-wheels E. Journaled in the center of this end of the casing is a large gear-wheel F, which meshes with all of the small cog-wheels E, and secured to the shaft of this gear-wheel F is a knob G for the turning of the same. Thus it will be seen that by revolving the knob G the receptacles C may be all revolved in unison. Each of the receptacles is adapted to contain some school utensils—such as pencils, pens, pen-wiper, eraser, sponge, crayons, &c.—and devices, such as spring-clamps H, may be secured upon the interior of the receptacles for holding the articles in place.

I is a metallic band surrounding the casing and adapted to slide thereon.

The receptacles when opened or closed are always flush with the exterior of the casing, and this band is adapted to be slid over the receptacles to hold them either opened or closed.

Rubber rings or bands J may surround the casing, so as to prevent the same from scratching the desk or causing noise in handling.

It will thus be seen by giving the knob G a slight turn all of the receptacles may be brought with their open side outward, thus exposing the contents to view and use, and when desired to close the same another slight turn of the knob G will turn all of the receptacles inward, and by slipping the band over the same they may be held in this position until the utensils are desired to be used again.

Of course while I have shown this companion in the most desirable form—that is, square—it is obvious that the same may be made triangular or any other polygonal form, so as to contain more or less receptacles, and instead of having a knob connected with the gear F for turning the same a push-button might be used in which a spiral thread would operate to turn the gear F by pressure.

Of course I do not wish to be limited to the exact construction here shown, as slight modifications could be made without departing from the spirit of my invention.

Having thus fully described my invention, what I claim as new and useful is—

1. In a device of the character described, a casing polygonal in cross-section, openings provided in each side of the casing, pan-shaped receptacles adapted to fit said openings, said receptacles pivoted at each end in the ends of the casing, and means for revolving said receptacles so as to bring their open side outward or inward, as and for the purpose specified.

2. In a device of the character described, a casing polygonal in cross-section, said casing being provided with openings formed through each face, shallow pan-shaped receptacles adapted to fit said openings, said receptacles being pivoted in each end of the casing, means for revolving all of said receptacles simultaneously so as to bring their open side outward or inward, and means for holding said receptacles in either position, as and for the purpose specified.

3. In a device of the character described, a hollow casing, polygonal in cross-section, said casing being provided with openings through each face, pan-shaped receptacles adapted to fit in said openings and pivoted in each end of the casing, a small cog-wheel secured to one of the pivots of each receptacle, a central gear-wheel meshing with all of the cog-wheels, means for revolving the central gear-wheel, and a band surrounding the casing and adapted to slide upon the same for holding the receptacles in either position, as and for the purpose specified.

4. In a device of the character described, a hollow casing polygonal in cross-section and provided with elongated openings formed through each face, pan-shaped receptacles fitted in said openings and pivoted in each end of the casing, cog-wheels secured to the pivots upon one end of the receptacle, a central gear-wheel meshing with all of the cog-wheels, a knob secured to the shaft of the central gear-wheel, a metallic band surrounding the casing and adapted to slide thereon for the purpose of holding the receptacles in either position, and a device contained within the receptacles for holding the utensils in place, as and for the purpose specified.

In testimony whereof I have hereunto affixed my signature in the presence of two subscribing witnesses.

THOMAS CRAWFORD.

Witnesses:
MARY E. HAMER,
L. W. MORRISON.